Sept. 18, 1928.
E. I. BRADDOCK
GEAR CHAIN
Original Filed May 22, 1920
1,685,019
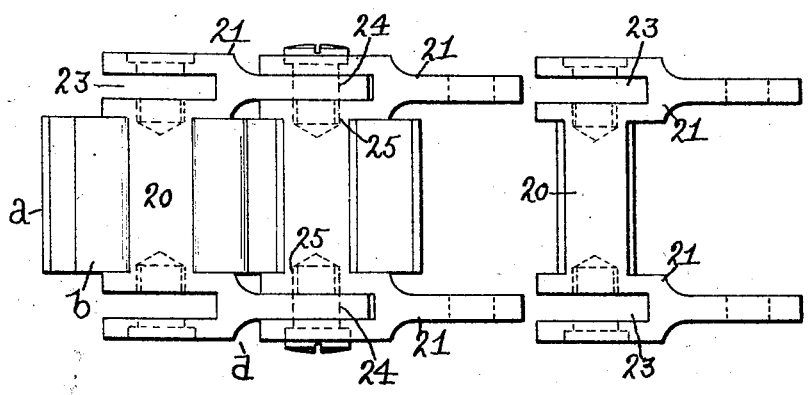

Patented Sept. 18, 1928.

1,685,019

UNITED STATES PATENT OFFICE.

EDWARD I. BRADDOCK, OF CLEVELAND, OHIO; ROBERT H. MONTGOMERY EXECUTOR OF SAID EDWARD I. BRADDOCK, DECEASED.

GEAR CHAIN.

Original application filed May 22, 1920, Serial No. 383,460. Divided and this application filed June 29, 1923. Serial No. 648,489.

This invention relates to a gear chain and has for its object to provide a gear chain, which is capable of being used with the standard gears commonly found on the market, whereby the standard gears are enabled to be used in many places or on jobs where specially cut gears and chains are now required.

The invention further has for its object to provide a gear chain, which is especially adapted for heavy work.

To this end, the gear chain is composed of links, each having a tooth between and attached to side arms, which are pivotally connected with the side arms of an adjacent link. The tooth of each link is provided with the same pitch as the pitch of the standard gear with which it is to be used, and the centers of the pivots for the side arms of adjacent links are located in the pitch line of the said gear.

The tooth and side arms of each link are preferably integral and made from a drop forging, and the tooth is preferably solid or continuous throughout its length and of substantially the same length as the teeth of the gear with which it is used.

The particular features of the invention will be pointed out in the claim at the end of this specification.

Fig. 1 is a plan view of a sufficient portion of a gear chain embodying this invention to enable it to be understood.

Fig. 2, a side elevation of the gear chain shown in Fig. 1 in mesh with a standard gear.

Fig. 3, a detail in plan of parts of a toothed link of the chain shown in Fig. 1, and Fig. 4, a side elevation of Fig. 3.

Referring to the drawing, $a$ represents a standard gear provided with teeth $b$ whose pitch line is represented by the circular line 10, and $d$ represents a gear chain embodying this invention and designed to be used with said gear. The gear chain $d$ comprises links of like construction and only two of which are shown in Figs. 1 and 2. Each link is provided with a tooth 20 located between and preferably formed integral with side arms 21, which are provided at their front ends with offset portions 22 forming slots 23, which are designed to receive the arms 21 of the next adjacent link and be pivotally connected therewith by pivot pins 24 having smooth portions which pass through the offset portions 22 of the arms 21 and provided with threaded end portions which engage threaded sockets 25 in the tooth 20. The offset portions 22 of one link, and the arms 21 of the link connected therewith by the pivot pins 24, turn on the smooth portions of said pivot pins.

The tooth 20 is preferably made solid or continuous and of substantially the same length as the tooth of the gear $a$ with which it engages, and the center of each pivot pin 24 is located in the pitch line 10 of the gear $a$.

A gear chain such as herein shown and described is especially designed for heavy work and for this reason it is preferred to make the tooth 20 and side arms 21 in one piece by drop forging the same.

It will be observed that the pivots 24 connecting the links are in the pitch line of the teeth 20 and that this pitch line corresponds with the pitch line of the teeth of the gear with which it co-operates, and therefore a single gear chain may be used with gears of different sizes but having the same pitch of teeth.

It will be observed that each link of the gear chain is provided with a single gear tooth which engages the teeth of the gear and has a pivotal connection with the next adjacent link of the chain on the pitch line of the gear.

As a result the gear chain herein described will co-operate and properly mesh with the common gear of standard pitch, thereby avoiding the necessity of cutting the gear to fit the chain.

Because the gear chain herein described does mesh properly with the standard gear, it enables the latter to be used in many places where now it requires specially cut gears and chains, and thereby enables certain jobs to be performed at a minimum cost.

By reference to the drawing, it will be seen that the gear teeth of the chain co-operate with the teeth of the gear in the same manner as the teeth of a co-operating gear, and therefore can be run in either direction.

Furthermore by making the links herein shown as a forging, a very strong gear chain especially useful for heavy work may be provided.

This application is a division of another application Serial Number 383,460 filed by me May 22, 1920.

What I claim is:

As an improved article of manufacture, a gear chain composed of links having solid teeth and provided with arms extended from the opposite sides of said teeth and rigidly secured thereto and provided at their front end with offset portions forming slots with the end of said solid teeth, and having the rear ends of the arms of one link extended into said slots in the arms of an adjacent link, pivot pins connecting adjacent links substantially on the pitch line of the tooth of said adjacent link and having smooth portions extended through the offset portions of the arms of one link and through the rear ends of the arms of the adjacent link and upon which said links turn.

In testimony whereof, I have signed my name to this specification.

EDWARD I. BRADDOCK.